United States Patent [19]
Rush

[11] Patent Number: 6,113,050
[45] Date of Patent: Sep. 5, 2000

[54] PORTABLE DESK FOR USE WITH LAPTOP COMPUTER

[76] Inventor: Adrienne J. Rush, 4616 Cedar Park Dr., Stone Mountain, Ga. 30083

[21] Appl. No.: 09/246,308

[22] Filed: Feb. 8, 1999

[51] Int. Cl.[7] .......................... A47B 91/00; A47B 95/00; A47G 29/00; B65D 19/00

[52] U.S. Cl. ................................ 248/346.01; 248/349.1; 248/918

[58] Field of Search .......................... 248/349.1, 346.01, 248/918, 163.1, 441.1, 129

[56] References Cited

U.S. PATENT DOCUMENTS

| | | | |
|---|---|---|---|
| 3,936,026 | 2/1976 | Hampel et al. | 248/349 |
| 4,648,574 | 3/1987 | Granlund | 248/349 |
| 5,137,236 | 8/1992 | Burns | 248/171 |
| 5,154,391 | 10/1992 | Hegarty | 248/454 |
| 5,232,276 | 8/1993 | Martin | 248/676 |
| 5,337,985 | 8/1994 | Hale | 248/174 |
| 5,470,041 | 11/1995 | Cucinotta | 248/349 |
| 5,529,322 | 6/1996 | Barton | 248/129 |
| 5,553,824 | 9/1996 | Dutra, Jr. | 248/346 |
| 5,555,491 | 9/1996 | Tao | 248/185.1 |
| 5,595,428 | 1/1997 | Huang | 248/918 |
| 5,623,869 | 4/1997 | Moss et al. | 248/917 |
| 5,722,624 | 3/1998 | Watt et al. | 248/205.1 |
| 5,769,369 | 6/1998 | Meinel | 248/176.1 |
| 5,859,762 | 1/1999 | Clark et al. | 248/246.01 |
| 5,876,002 | 3/1999 | White et al. | 248/918 |
| 5,971,148 | 10/1999 | Jackson | 248/918 |

*Primary Examiner*—Ramon O. Ramirez
*Assistant Examiner*—Jerome A. DeLuca
*Attorney, Agent, or Firm*—John D. Gugliotta

[57] ABSTRACT

A portable desk for use with a lap-top computer is disclosed, comprising a main housing, of a generally rectangular configuration, which rotates about a base support. A rear member provides back and support for the laptop once the laptop is placed on the present invention. A series of port holes in the rear member permit access to the ports on the laptop from the back of the present invention. A wrist pad provides support for the user's wrists. A retractable mouse tray extends out laterally from the main housing. A laterally adjustable document display means is located at the rear of the present invention, behind the rear member. A lighting means is powered by a rechargeable battery, the battery located in a power box against which the laptop computer rests. An on-off switch on the power box turns the lighting means on and off. A retractable AC power cord is located inside the rear member. Retractable and telescoping legs are positioned under the base support. A handle is used to carry the present invention when not in use.

14 Claims, 7 Drawing Sheets

PORTABLE DESK FOR USE WITH LAPTOP COMPUTER

RELATED APPLICATIONS AND DISCLOSURES

The present invention is a continuation of the Disclosure Document filed on May 19, 1998. There have been no previously filed, nor any co-pending applications, anywhere in the world.

BACKGROUND OF THE INVENTION

1. Field of the Invention

The present invention relates generally to furniture, and, more particularly, to a portable desk for use with a laptop computer.

2. Description of the Related Art

Portable laptop computers have become a mainstay in the business world. Especially popular among those that travel, the laptop computer allows one essentially to take his business on the road, creating a virtual office wherever he goes.

Tapping into peripheral accessories such as portable printers, CD-ROMs and modems, many laptop users have access to most of the features and functionality that they have grown to depend on in the office setting. Having volumes of information at their disposal on a seconds notice, use of these and other like devices have revolutionized the way business is carried out by allowing decisions and agreements to be made in remote locations throughout the civilized nations rather than from the typical, centralized home-office.

However, one aspect of the virtual office that leaves much to be desired relates to the fact that, although the functionality of these systems is great, the ergonomics involved with their design is not. Portable laptop users are often faced with propping their computers on their laps, on airplane seat trays or in other awkward positions where desktop space is limited, resulting in uncomfortable working conditions and a general lack or organization. Accordingly, the need has developed for a means by which one can use a personal laptop computer in a comfortable and organized manner without compromising the compact nature of the device.

In the related art, several devices are disclosed which attempt to address this need for a comfortable, ergonomic means to use a laptop computer. Several patents disclose a rotatable laptop computer stand/support and swivel base. These include U.S. Pat. No. 5,470,041, issued in the name of Cucinotta, U.S. Pat. No. 4,648,574, issued in the name of Grandlund, and U.S. Pat. No. 3,936,026, issued in the name of Hampel.

U.S. Pat. No. 5,722,624, issued in the name of Watt et al., describes an adjustable support that clamps onto a tabletop.

U.S. Pat. No. 5,154,391, issued in the name of Hegarty, discloses a multi purpose computer stand.

Several patents disclose an adjustable length laptop computer tray assembly. These include U.S. Pat. No. 5,553,824, issued in the name of Dutra, Jr., and U.S. Pat. No. 5,337,985, issued in the name of Hale.

U.S. Pat. No. 5,137,236, issued in the name of Burnes, discloses a swivel tripod support apparatus.

A search of the prior art did not disclose any patents that read directly on the claims of the instant invention. Consequently, a need has been felt for providing an apparatus and method which overcomes the problems cited above.

SUMMARY OF THE INVENTION

It is therefore an object of the present invention to provide an improved portable desk for use with a laptop computer which facilitates ergonomic, comfortable, and efficient use of a laptop computer.

Briefly described according to one embodiment of the present invention, a portable desk for use with a laptop computer is disclosed. The present invention provides the user with a convenient means by which to store, transport and use a laptop computer, and comprises a main housing, of a generally rectangular configuration, which rotates about a base support. A rear member provides rear support for the laptop once the laptop is placed on the present invention. A series of port holes in the rear member permit access to the ports on the laptop from the back of the present invention.

A wrist pad provides support for the user's wrists. A retractable mouse tray extends out laterally from the main housing. A laterally adjustable document display means is located at the rear of the present invention, behind the rear member.

A lighting means is powered by a rechargeable battery, the battery located in a power box against which the laptop computer rests. An on-off switch on the power box turns the lighting means on and off. A retractable AC power cord is located inside the rear member.

Retractable and telescoping legs are positioned under the base support. A handle is used to carry the present invention when not in use.

It is another object of the present invention to provide a device that secures and protects a laptop computer.

It is another object of the present invention to provide a device that provides an ergonomic work surface. This is accomplished via features including a comfortable wrist resting pad, integrated peripheral and power ports, a slide-out mouse pad, an omnidirectional work light, and an integrated document holder.

It is another object of the present invention to provide an adjustable stand, that folds out and is telescopic in design, which allows for convenient computer mounting thereto. This feature permits the operator to tailor the height of the present invention to fit his or her particular size and height, as well as to accommodate the room constraints put on the user by the surrounding area.

Other objects of the present invention include providing a device that is lightweight in design, strong, durable construction, and easy and cost-effective to manufacture.

| DESCRIPTIVE KEY | |
|---|---|
| 10 | portable desk for use with a lap-top computer |
| 20 | laptop computer |
| 30 | main housing |
| 40 | laptop resting surface |
| 50 | base support |
| 60 | scratch resistant material |
| 70 | rear member |
| 80 | port hole |
| 90 | port |
| 95 | cable |
| 100 | wrist pad |
| 120 | document display means |
| 130 | power box |
| 140 | lateral support member |
| 150 | access orifice |

-continued

DESCRIPTIVE KEY

| | |
|---|---|
| 160 | lighting means |
| 165 | keyboard |
| 170 | rechargeable battery |
| 180 | on/off switch |
| 185 | retractable mouse tray |
| 190 | leg member |
| 200 | retractable power cord |
| 210 | handle |
| 220 | support stand |
| 230 | main surface |
| 240 | main shaft |
| 250 | base |
| 260 | wheel |
| 270 | support beam |
| 280 | support stand securement means. |

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 9.

1. Detailed Description of the Figures

Figure 1:
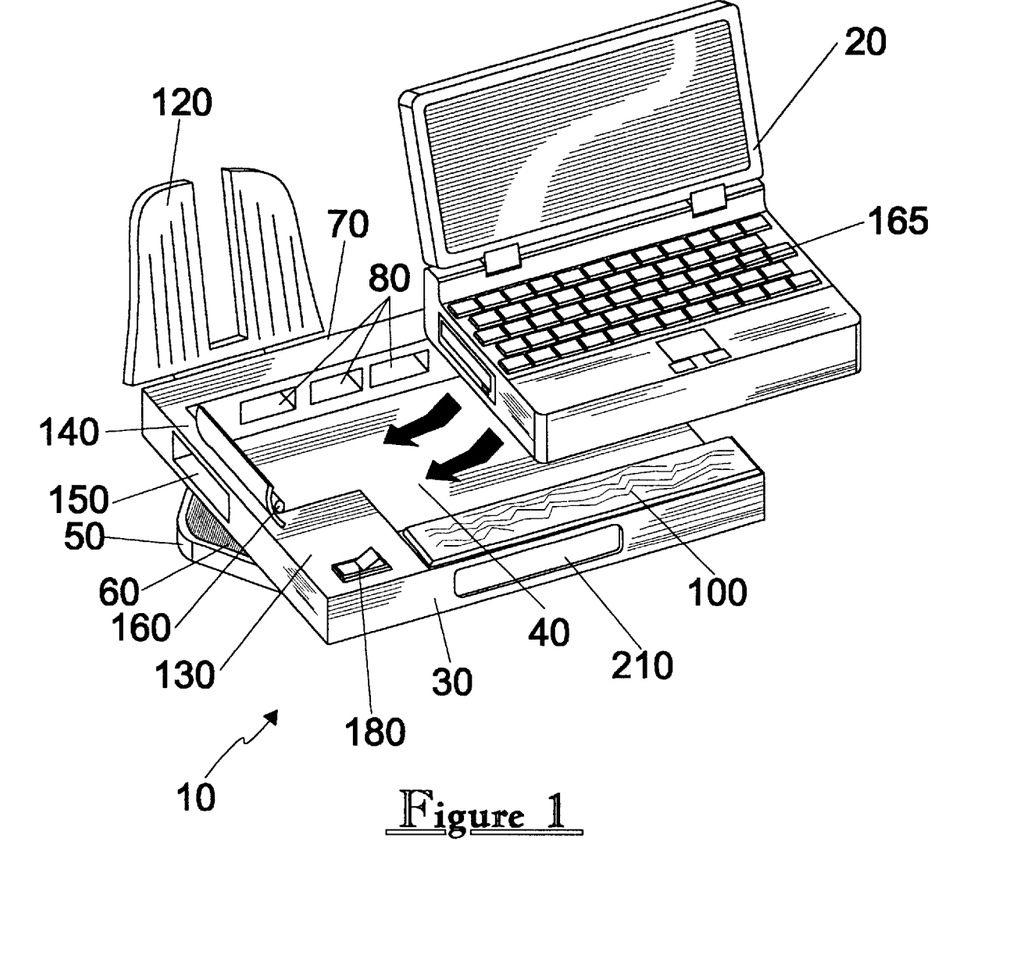
FIG. 1 is a perspective view of the preferred embodiment of portable desk for use with a lap-top computer 10 shown with a laptop computer.
Figure 2:
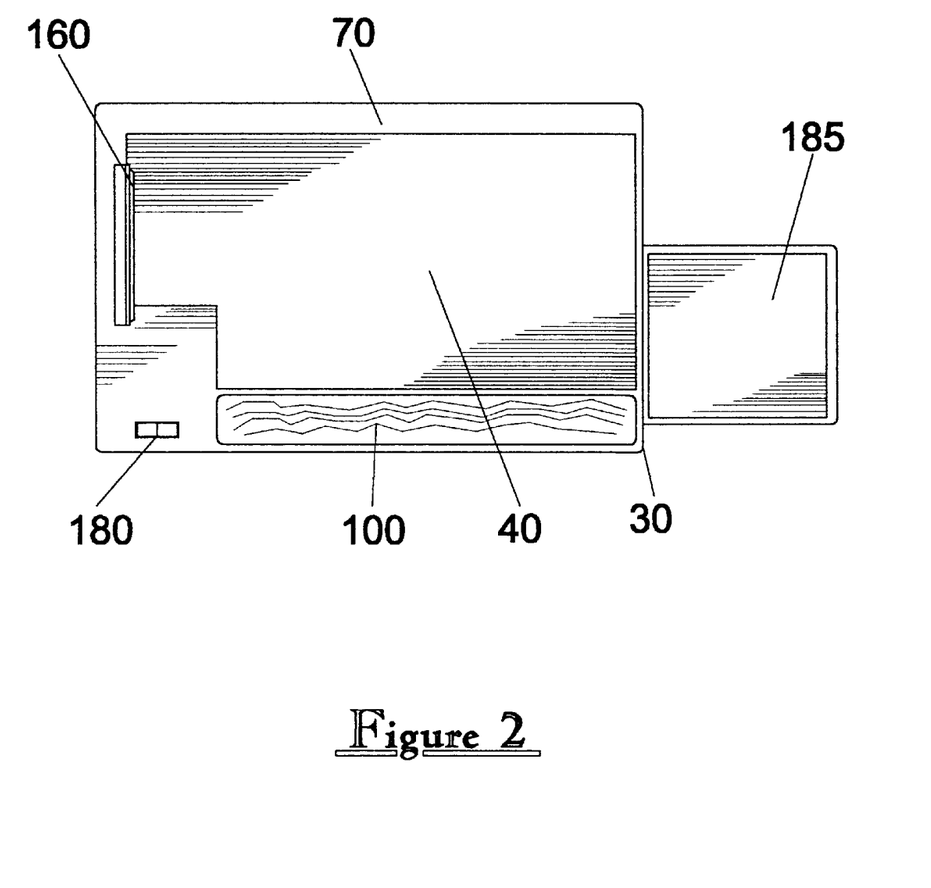
FIG. 2 is a top view thereof.

Referring now to FIGS. 1 and 2, a portable desk for use with a lap-top computer 10 is shown, according to the present invention, provides the user with a convenient means by which to store, transport and use a laptop computer 20. A main housing 30 is disclosed, of a generally rectangular configuration, with an laptop resting surface 40 being generally planar to support a laptop and other materials. Although the laptop resting surface 40 is illustrated as rectangular, any suitable shape which supports a laptop computer 20 is contemplated by the invention. The main housing 30 is comprised of a material selected from the group comprising plastic or lightweight metal.

The main housing 30 is positioned on a base support 50, such that the main housing 30 rotates in a horizontal plane along an arc of at least 90 degrees. A scratch resistant material 60 is positioned on the lower surface of the base support 50 to both reduce lateral movement of the base support 50 during rotation of the main housing 30, and to reduce scratching to the surface upon which the present invention is resting, such as a table or desk.

Located at the rear of the main housing 30, and extending upward above the laptop resting surface 40 of the main housing 30, is a rear member 70. The rear member 70 is designed such that the rear of a laptop computer 20 can rest securely against the rear member 70, providing a mechanical barrier to backward movement of the laptop computer 20 off of the laptop resting surface 40 of the main housing 30.

Figure 3:
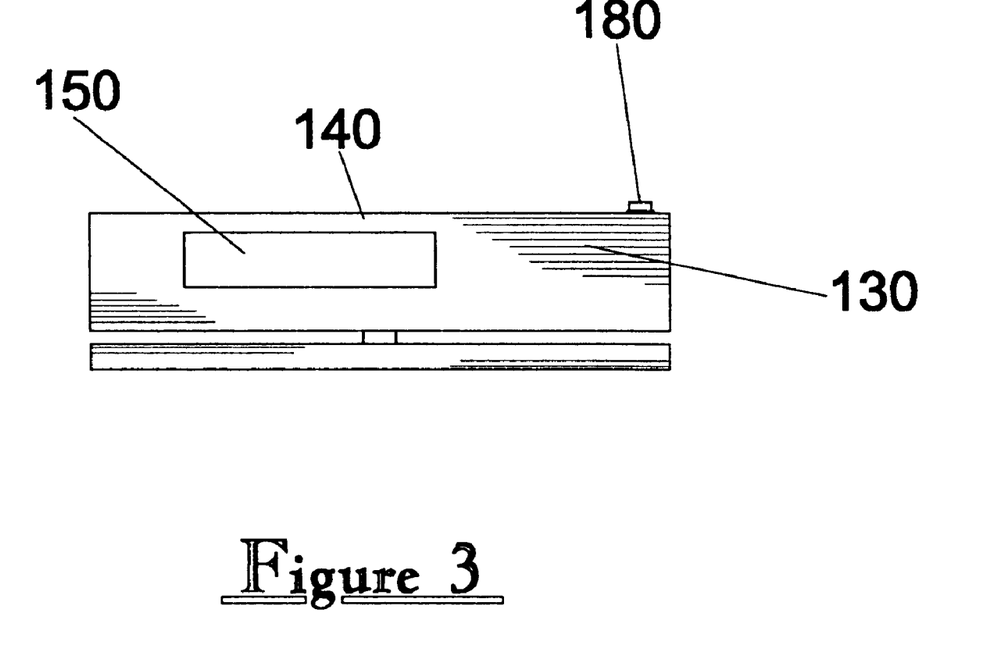
FIG. 3 is a left side view thereof.

Referring now to FIG. 3, the anterior surface of the rear member 70 is generally vertically planar in configuration, such that the laptop computer 20 will rest flush against the anterior surface.

Figure 4:
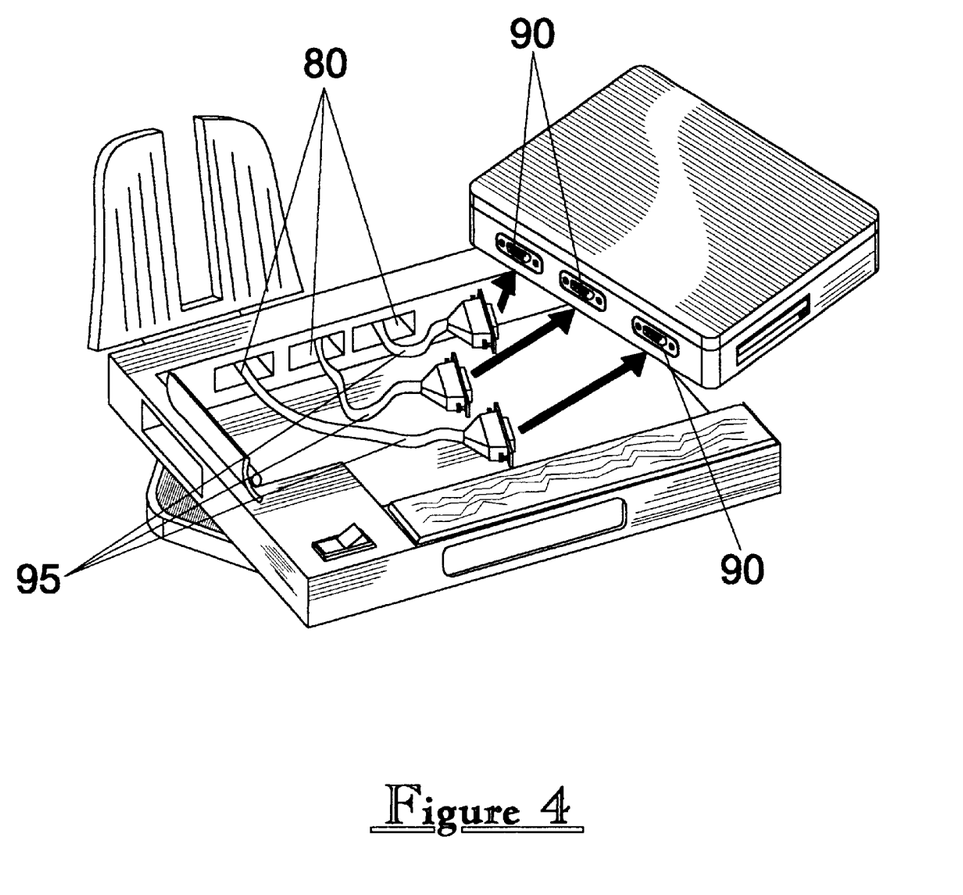
FIG. 4 is an exploded view thereof.

Referring now to FIGS. 1 and 4, a series of port holes 80 are formed by the rear member 70. The port holes 80 are generally rectangular in configuration, and extend horizontally rearward, completely penetrating through the rear member 70. The positions of the port holes 80 correspond to the locations of the ports located on the rear of the typical laptop computer 20, such that the port holes 80 are located against the ports 90 when the laptop computer 20 is positioned on the present invention for use. In this embodiment, three port holes 80 are depicted, so as to correspond to the traditional printer port 90, fax/modem port 90, and CD-rom or external drive port 90. The cross sectional diameter of the port holes 80 are such that cables 95, such as a printer cable 95 and similar cables 95, can be easily inserted through the rear member 70 and into the ports 90 of the laptop computer 20.

Referring now to FIGS. 1 and 2, a wrist pad 100, of a generally rectangular configuration, is positioned on the laptop resting surface 40 of the main housing 30, along the posterior of the present invention, so as to facilitate resting of wrists thereon during use of a laptop computer 20. The top surface of the wrist pad 100 is constructed of a comfortable, deformable material to assist in comfort.

Referring now to FIG. 1, a document display means 120 is located at the rear of the present invention, behind the rear member 70. The document display means 120 is designed to hold paper in an upright position. The document display means 120 is capable of lateral adjustment along the rear of the rear member 70, so as to facilitate optimum position placement for the benefit of the operator. The document display means 120 is capable of extending laterally outward beyond the main housing 30.

Figure 5:
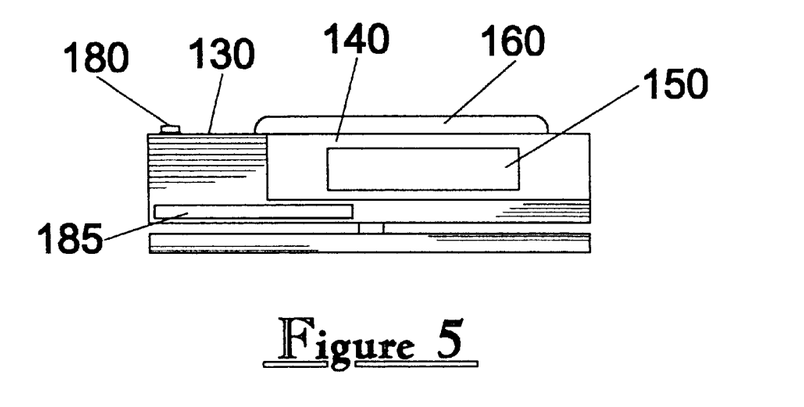
FIG. 5 is a right side view thereof.

Referring now to FIGS. 1, 3 and 5, a power box 130, of generally rectangular configuration, is located on the laptop resting surface 40 of the main housing 30, on a front corner of the present invention, when facing the present invention. The interior wall of the power box 130 is designed to support and to permit a laptop computer 20 to rest flush against it.

The power box 130 extends laterally along the front of the present invention, such that when the laptop computer 20 rests against the interior wall of the power box 130, an open space is formed behind the power box 130, bounded by the power box 130 on one side, the rear member 70 on the opposite side, and the laptop computer 20 on the interior side.

A lateral support member 140, of generally horizontally elongated, rectangular configuration, extends rearward from the power box 130 to the rear member 70, connecting to both the rear member 70 and power box 130. The lateral support member 140 does not extend completely downward to the laptop resting surface 40 of the main housing 30. As a result, an access orifice 150 is formed, bounded on top by the lateral support member 140 and on the bottom by the laptop resting surface 40 of the main housing 30. The access orifice 150 is positioned on the present invention so as to give the user access to the CD-rom, DC access port, power button or disk drive located on the side of a traditional laptop computer 20, depending on the type of laptop computer 20, when the laptop is positioned on the present invention for use thereon. The size of the access orifice 150 is sufficient to permit easy access to the CD-rom or disk drive on the laptop computer 20.

Referring now to FIG. 1, a lighting means 160 is positioned on the top surface of the lateral support member 140. The lighting means 160 is of a generally linearly elongated, rectangular configuration, running along the elongated centerline of the lateral support member 140, and positioned so as to illuminate the keyboard 165 of the laptop computer 20 and the papers on the document display means 120. For purposes of disclosure, an omni-directional light is shown.

A rechargeable battery 170 (not shown), located in the power box 130, is a source of power for the lighting means 160. An on/off switch 180 is located on the power box 130 and is used to turn the lighting means 160 on and off.

Figure 6:
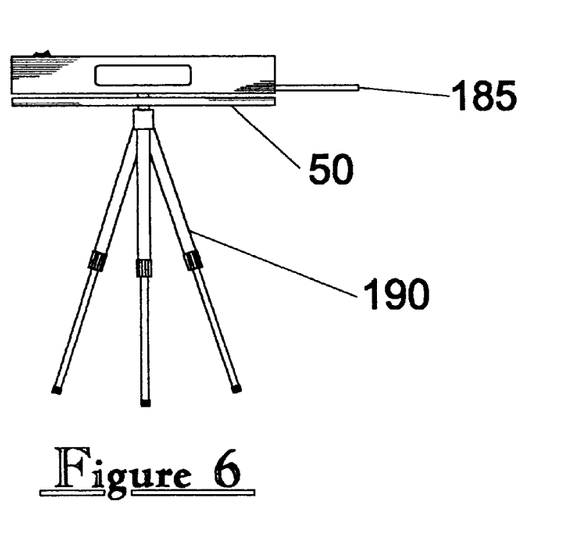
FIG. 6 is a front view thereof, shown with legs extended.

Referring now to FIGS. 2, 5 and 6, a retractable mouse tray 185 is located on the side of the main housing 30, and is of a generally horizontally elongated, rectangular configuration. The retractable mouse tray 185 extends out laterally from the main housing 30, and is of a size sufficient to permit use of a traditional mouse thereon. For purposes of disclosure, the retractable mouse tray 185 is depicted as located on the right side of the present invention, when facing the anterior of the present invention. It is envisioned that the retractable mouse tray 185 may be placed either on the right side, left side, or both sides of the main housing 30, so as to facilitate use by both left handed and right-handed operators.

Referring now to FIG. 6, it is envisioned that leg members 190 may be connected to the underside of the base support 50 using a quick disconnect or preferably, may be permanently attached. For purposes of disclosure, the leg members 190 are illustrated as three telescoping, retractable leg members 190 in a tripod configuration although a greater number of leg members 190 may be employed. Each leg is shown having a height adjustment means which allows each leg to be maneuvered and locked at different heights for the comfort and convenience of the user and the environmental conditions. The invention provides a laptop computer 20 user with a convenient sturdy and functional workstation nearly anywhere. The leg members 190 may be adjustable to a variety of heights and allow the main housing 30 to stand independent of any other supporting devices, and this creates a workstation in any public or private location. The legs 190 are advantageously designed to collapse against lower surface of the base support 50.

The support of the& present invention is extremely portable and may be quickly erected and used in any location where there is no existing desk or table surface available to the user. Rather than being forced to balance the laptop computer 20 on the user's lap and fumble to read papers, a user may create a personal workstation, thus allowing the user to focus and concentrate on the work at hand.

Figure 7:
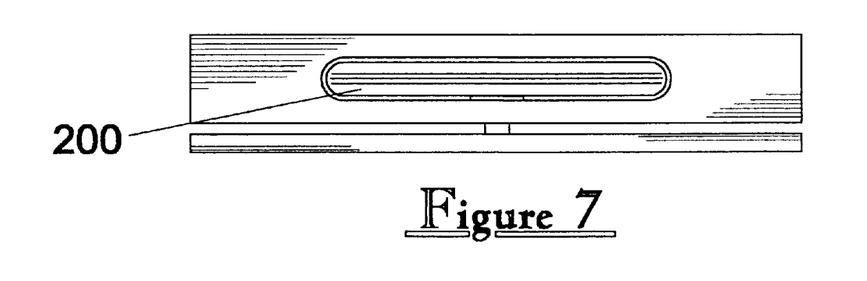
FIG. 7 is a back view thereof.

Referring now to FIG. 7, a retractable power cord 200 is located inside the rear member 70.

Figure 8:
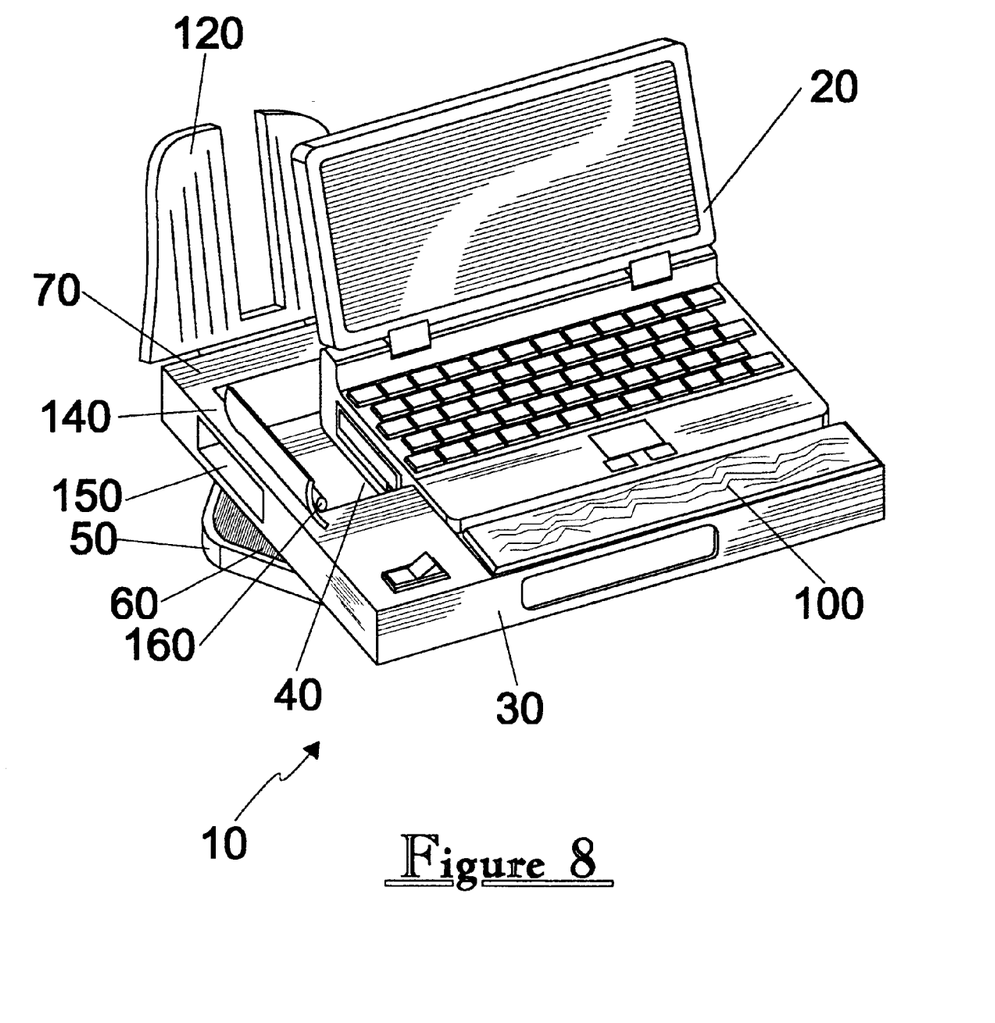
FIG. 8 is a perspective view thereof with a laptop computer in place to be used.

Referring now to FIG. 1, a handle 210 is located on the anterior wall of the present invention. The handle 210 is of a conventional design. It is envisioned that the handle 210 may be positioned in numerous locations on the present invention FIG. 8 shows a laptop computer being inserted into the present invention.

Figure 9:
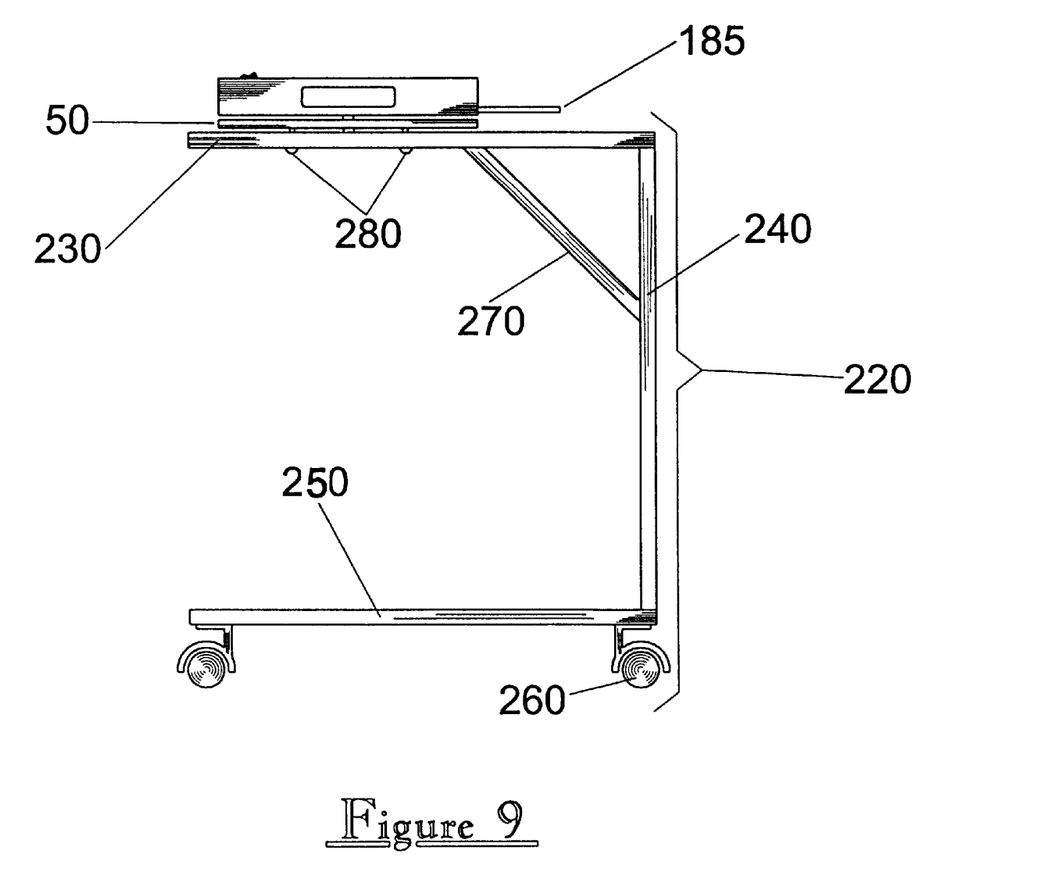
FIG. 9 is a perspective view of the present invention with a detachable support stand.

Referring now to FIG. 9, it is envisioned that the base support 50 may be releasably secured to a support stand 220. The support stand 220 is similar to those used in hospitals by patients in bed.

The support stand 220 consists of a flat, rectangular main surface 230, on which the base support 50 rests and is secured.

A linearly elongated main shaft 240 extends downward from the main surface 230, perpendicular to the plane formed by the main surface 230. The main shaft 240 is telescoping. The main shaft 240 terminates in a linearly elongated, T-shaped, base 250, which is perpendicular to the elongated centerline of the main shaft 240.

The base 250 has a plurality of wheels 260 attached to the bottom surface. As such, the support stand 220 forms a generally block, C-shaped configuration.

A support beam 270 attaches to both the main shaft 240 and the main surface 230, and supports the main surface 230 in a generally horizontal plane.

Securement of the support stand 220 to the base support 50 is achieved via support stand securement means 280.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

Referring now to FIG. 8, to use the present invention, the operator places the present invention is a desirable location, utilizing the legs 190 or support stand 220 if desired. The laptop computer 20 is placed on the laptop resting surface 40 of the main housing 30, against the rear member 70 and power box 130. Cables 95 for the printer, modem and the like are placed through the back of the rear member 70, through the corresponding port hole 80, and into the correct port 90 in the rear of the laptop computer 20. The user then turns on the laptop computer 20. If necessary, the access orifice 150 is used to place a CD-ROM or computer disk into the laptop computer 20. To add light, the lighting means 160 is activated via the on/off switch 180 on the power box 130. The document display means 120 may be adjusted for the user's satisfaction, and the retracting mouse tray 185 is extended laterally outward to support a mouse, if desired.

The foregoing description is included to illustrate the operation of the preferred embodiment and is not meant to limit the scope of the invention. The scope of the invention is to be limited only by the following claims.

What is claimed is:

1. A portable desk for use with a lap-top computer comprising:

a main housing, said main housing having a lap-top resting surface that is generally planar to support a lap-top and other materials;

a base support, located beneath said main housing;

a rear member;

a plurality of port holes, each said port hole formed by said rear member, and each said port hole extending horizontally rearward, completely through said rear member;

a wrist pad, said wrist pad positioned on said lap-top resting surface of said main housing, along the posterior of said present invention, so as to facilitate resting of wrists thereon during use of a lap-top computer;

a retractable mouse tray, located on the side of said main housing, document display means, located at the rear of said main housing, behind said rear member, said document display means designed to hold paper in an upright position, and is capable of extending laterally outward beyond said main housing;

a power box wherein said power box extends laterally along the front of the present invention, such that when said lap-top computer rests against the interior wall of said power box, an open space is formed behind said power box, bounded by said power box on one side, said rear member on the opposite side, and said lap-top computer on the interior side;

a lateral support member, of generally horizontally elongated, rectangular configuration, said lateral support member extending rearward from said power box to said rear member, connecting to both said rear member and power box;

lighting means;

a retractable power cord, located inside said rear member;

a plurality of leg members, each said leg member connected to the underside of said base support;

a handle;

a rechargeable battery; and an on/off switch.

2. The portable desk for use with a lap-top computer described in claim 1, further comprising an access orifice bounded on top by said lateral support member and on the bottom by said lap-top resting surface of said main housing.

3. The portable desk for use with a lap-top computer as described in claim 2, wherein said access orifice is positioned so as to give the user access to a CD-rom, DC access port, power button and disk drive of said lap-top computer when said lap-top computer is positioned for use thereon.

4. The portable desk for use with a lap-top computer as described in claim 2, wherein the size of said access orifice is sufficient to permit easy access to a CD-rom or a disk drive on said lap-top computer.

5. The portable desk for use with a lap-top computer described in claim 1, wherein said lighting means is positioned on the top surface of said lateral support member so as to illuminate a keyboard of said lap-top computer and said document display means.

6. The portable desk for use with a lap-top computer described in claim 1, wherein each said leg member is retractable and telescoping, retracting against the lower surface of said base support.

7. The portable desk for use with a lap-top computer described in claim 1, wherein said retractable mouse tray may be interchangeably placed either on either side of said main housing, so as to facilitate use by either left-handed or right-handed individuals.

8. The portable desk for use with a lap-top computer described in claim 1, wherein said rear member provides a mechanical barrier to backward movement of said lap-top computer off of said lap-top resting surface of said main housing.

9. The portable desk for use with a lap-top computer described in claim 1, wherein said main housing rotates in a horizontal plane along an arc of at least 90 degrees.

10. The portable desk for use with a lap-top computer described in claim 1, wherein said retractable mouse tray extends out laterally from said main housing.

11. The portable desk for use with a lap-top computer described in claim 1, further comprising a base support, said base support capable of being releasably secured to said support stand.

12. The portable desk for use with a lap-top computer of claim 11, wherein said base support further comprises:

a flat, rectangular main surface, on which the base support rests and is secured;

a linearly elongated main shaft, said main shaft extending downward from the main surface, perpendicular to the plane formed by the main surface, and telescoping in design;

a base, said base used to support said main shaft; and wheels, said wheels located on the bottom surface of said base.

13. The portable desk for use with a lap-top computer described in claim 1, wherein said document display means is capable of lateral adjustment along the rear of said rear member, so as to facilitate optimum position placement for the benefit of the operator.

14. The portable desk for use with a lap-top computer described in claim 1, wherein said interior wall of said power box is designed to support and to permit a lap-top computer to rest flush there against.

* * * * *